May 1, 1962 G. E. HANSEN 3,032,310
FABRICATED GATE VALVE AND METHOD OF MAKING SAME
Filed Feb. 24, 1959
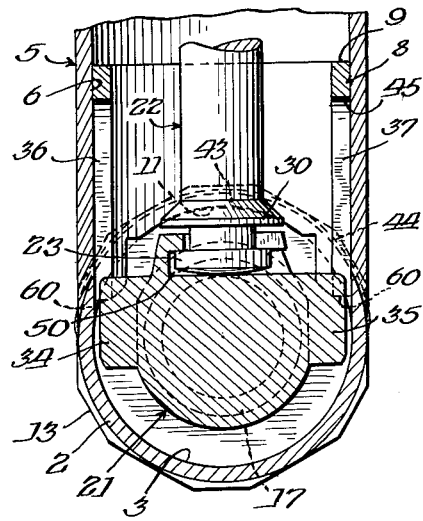
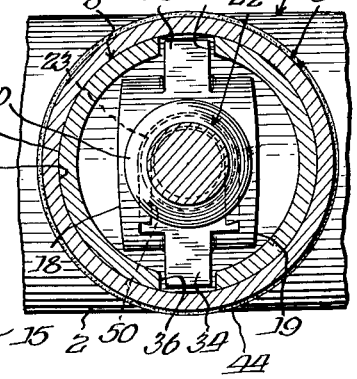
Inventor.
George E. Hansen.

United States Patent Office 3,032,310
Patented May 1, 1962

3,032,310
FABRICATED GATE VALVE AND METHOD OF MAKING SAME
George E. Hansen, Elmwood Park, Ill., assignor to Crane Co., Chicago, Ill., a corporation of Illinois
Filed Feb. 24, 1959, Ser. No. 794,874
6 Claims. (Cl. 251—327)

This invention relates to a fabricated gate valve, and more particularly it is concerned with the specific construction of such article per se and the method of making the same.

It has long been a serious problem in connection with providing for sound castings especially on the smaller sizes of valves that the cross-sectional integrity of the casting could not be guaranteed, especially on such pressure sealing devices as the valve body or casing, bonnet or centerpiece, and the valve seats.

Accordingly, it is one of the more important aspects of this invention to provide for a fabricated valve in which the valve casing and the guides as well as the centerpiece or bonnet therefor can be conveniently constructed of readily available materials, preferably of a metal that has been previously worked such as tubing for example whereby to provide reasonable assurance that the metal is homogeneous and tight against relatively high fluid pressures.

Another object is to provide for a method of making a valve in which the valve seats can be easily inserted and quickly and effectively sealed in fluid tight relation to the body or casing, while at the same time positioning the body seat rings firmly against each side of the valve closure member, thereby to assure of a valve casing and a closure combination in which the seats are virtually tailored and accurately fitted in each assembly thereof.

Another object of this invention is to provide for a gate valve construction in which the stuffing box as well as the journalling means for the valve stem permits of an assembly of elements in which the stem is comparatively closely guided in relation to the valve closure member as well as being securely journalled in a threaded relation within an integral depending elongated portion of the valve stuffing box.

A further object is to provide for a construction in which the valve closure member is relatively snugly guided by a closely fitted guide member preferably insertable from outside the casing and suitably formed to fit securely over the end inserted seat rings forming extended end portions of the valve body while preferably also serving as the means for connection to the pipeline.

A still further object is to provide for a valve construction in which the body may be made economically of a cheap and commercially easily obtainable tubing transversely apertured at a side portion to receive the valve trimmings and allow for easy assembly of such members as the gate or closure member, the stem, the valve guide, the stuffing box and the centerpiece.

A further object is to provide for a fabricated gate valve in which the assembly of the parts is sufficiently flexible to enable the final assembling of the casing and the valve trimmings either by welding, brazing, soldering, or other convenient methods normally available in valve manufacturing facilities.

Other objects and advantages will become more readily apparent upon proceeding with the specification read in light of the accompanying drawings, in which:

FIG. 1 is a sectional assembly view of a valve embodying my invention;
FIG. 2 is a sectional view taken on the line 2—2 of FIG. 1; and
FIG. 3 is a sectional view taken on the line 3—3 of FIG. 1.

Similar reference numerals refer to similar parts throughout the several views.

Referring now to FIG. 1, the valve body or casing generally designated 1 consists of a small piece or length of tubing predeterminately selected to provide the desired peripheral dimensions for the interior and exterior portions as at 2 and 3. At the upper side portion of the said length of tubing, it is cut out circularly as at 4 for reasons hereinafter explained at greater length.

In saddled relation thereto, an outer member or centerpiece generally designated 5 is made with a lower interior portion thereof flared as at 6 and of an inside diameter substantially equal to the said circular aperture defined by 4 in the casing. The lowermost end portion of the said centerpiece straddles the casing 1 as indicated at the line 7. The said arrangement of elements thus provides the exterior enclosure for the tubular member or sleeve 8 which is snugly received as indicated at 10 within the circular surface portion defined by 6 of the centerpiece 5. The length of the said sleeve is preferably made to extend upwardly as at 9 whereby to limit the amount of longitudinal movement thereof to a desired minimum. At its lowermost inner edge portion, the sleeve 8 as at 11 is arcuately formed or recessed so as to straddle the respective end inserted seat members 12 and 13. It will be noted that the latter members have screw thread ends at 14 and 15 for suitable attachment to a pipeline, although obviously they may be made suitable for a welded connection, or brazed, soldered, or flanged, if desired, to provide an acceptable type of pipeline connection depending upon conditions encountered in the field. The said seat members are fitted snugly at 42 and 43 within the bore of the casing defined by the inner annular surface 3 and at their innermost end portion are provided with the tapered seats 16 and 17 for engagement by similarly tapered surfaces 18 and 19 on the valve closure member generally designated 21. As a matter of fact, it will be clear that the extent of the insertion of the said seats within the tubular casing 1 is limited by their inner end contact made with the surfaces 16 and 17, respectively, in cooperation with the seating surfaces 18 and 19 of the closure member generally designated 21. Thus, the valve seats 12 and 13 are suitably rotated and then inserted to the extent that their respective tapered surfaces 16 and 17 coincide with the closure member surfaces 18 and 19 and thus the latter serves as the means for maintaining the said valve seats in predetermined spaced-apart relation.

A valve stem generally designated 22 engages the valve closure member 21 by means of the T-head 23 fitted within the slot 50 of the said closure member. It is threaded as at 24 so that by suitable rotation of the stem the latter member is axially movable within the internally threaded elongated cylindrical extension 26 of the stuffing box 25. The stem has the usual backseating surface 30 for engagement with the stuffing box surface 40.

Superposed upon the uppermost limit of the extension 26, the stuffing box is annularly shouldered as at 27 and provided with the packing chamber 28. The threads 29 receive the usual stuffing nut 31 with the interposed gland 32 for compressing the packing. A conventional handwheel 33 is used for effecting the usual rotation of the threaded stem in opening and closing the valve.

As previously described, the upper transverse opening 4 of the casing 1 snugly receives the sleeve 8. Such close reception makes certain that the said sleeve member will not be transversely movable to any substantial extent with relation to the casing 1. Further, as is clearly shown in FIG. 2, the closure member 21 is provided with the side ears 34 and 35 which engage the oppositely disposed slots 36 and 37 respectively of the sleeve 8 during the course of movement of the valve reciprocally in opening and closing directions. The upper limits of the said slots are defined by the end 45, and the lower end limits thereof by the opposite sleeve extensions 60, 60.

The closure member is thus guided not only by the cylindrical extension 26 of the stuffing box which is either weld sealed or brazed as at 38 to the centerpiece 5, but it also is guided at the lower portion of the centerpiece 5 by means of the slots 36 and 37.

The seats 12 and 13 upon being properly positioned with respect to their tapered seat surfaces coinciding with closure member tapered seat surfaces within the casing 1, then have heat applied, say by blow-torch to the assembly, so that the solder rings, as indicated at 39 and 41, may melt and flow suitably between the surfaces 3 of the casing and the respective outside surfaces 42 and 43 of the seat rings. The method used in making the centerpiece and stuffing box attachment annularly at 38 follows a procedure similar to that above described in that around the portion defined by the annular surface 20 of the extension 26 an effective sealing arrangement for the stuffing box member 27 is provided. It will be appreciated that for convenience in handling the assembly of the said stuffing box with the centerpiece the connection at 38 is preferably made immediately rather than awaiting the subsequent assembly and attachment of the centerpiece with the casing 1 as hereinabove described. This procedure will enable the threaded stem 22 to be journally inserted into the stuffing box opening as defined at 40, with the closure member 21 then slipped over the stem head 23 for its insertion into the casing in the seated position shown with the stem attached. While the sleeve 8 can be positioned within the extension inner surface 6 without sealing of the enclosure 5, it may be desirable under certain conditions to apply an interposed seal between the surfaces 6 and the outer surface 10 of the sleeve 8.

It will be appreciated that while a relatively compact assembly has been provided for the closure member and casing, including the mounting for the stem and stuffing box, an important aspect of this invention also lies in the method of assembly. The latter procedure thus provides that each valve may be suitably machined on the seats, for example, by independently applied grinding of accurate finishes as at surfaces 16 to 19 inclusive. Also because of the fact that the valve assembly takes place while the parts are relatively snugly positioned and then finally sealed after heat is withdrawn to cause the soldering or brazing to take place, by circulation, a very accurate seating arrangement for the valve is the result.

The illustrated structure may of course be subjected to many modifications by those skilled in the art and still remain within the spirit of my invention, and therefore I wish to be limited only by the scope of the appended claims.

I claim:

1. In a gate valve, the combination of a valve casing and a reciprocally movable closure member therefor with oppositely disposed sloping seating surfaces, means for actuating said closure member, the said casing consisting of a length of tubing having an upper transverse apertured portion, a slotted guide member for the said closure member of tubular form with oppositely disposed slots extending parallel to the central axis of the said guide member, an inner end portion of the said guide member being mounted snugly in said tubing transverse apertured portion, the said closure member having oppositely disposed means thereon slidably engaging the slots of the said guide member, a centerpiece snugly fitted over the said guide member in fluid sealing relation to the said casing and being formed at its lower limit with inwardly curved edges straddling the said casing on an outer perimetrally extending surface thereon adjacent the said upper transverse apertured portion of said tubing, valve seat members for said closure member with cylindrical end portions positioned in the casing and retained in the casing from opposite ends of the said casing, the said seat members having their inner end limits defined by sloping annular surfaces forming seats mating with said oppositely disposed sloping seating surfaces on the said closure member when the latter member is in the valve closed position, smooth cylindrical mating surfaces on the said valve seat members and on the said seat member retaining valve casing and a solder joint whereby in assembly, the seat members may be inserted and rotated to mate with the seating surfaces of said valve closure member and fixed in position by the solder joint.

2. A gate valve construction, the combination of a valve casing and a movable closure member therefor having oppositely disposed tapered seating surfaces, means for reciprocally moving the said closure member, the said casing consisting of a length of tubing having an upper transverse apertured portion, a guide member for the said closure member of tubular form with the lower portion thereof received snugly within said tubing upper apertured portion and having oppositely disposed slots extending parallel to the central axis of the said guide member, the said closure member having oppositely disposed ears slidably engaging the slots of the said guide member during the reciprocating movements of said closure member, a centerpiece snugly fitted over the said guide member in fluid sealing relation to the said casing and being formed at its lower limit with oppositely disposed arcuately extending recesses on inner edges thereof straddling an outer curved surface of the said casing adjacent to and outwardly of the transverse apertured portion of the casing, valve seat members mounted in opposite open ends of the said casing to cooperate with said closure member, the said seat members having their inner end limits projecting within said casing and being defined by tapered annular seating surfaces mating with said oppositely disposed tapered seating surfaces thereon and a solder joint therebetween whereby in assembly, the said seat members may be inserted and rotated to mate the seating surfaces thereof with the oppositely disposed tapered seating surfaces of the closure member and fixed in position by the solder joint, the smooth cylindrical surfaces of said seat members projecting past the arcuately extending recesses of said guide member lower portion and being snugly received within the casing tubing in said mating with each of the oppositely disposed tapered seating surfaces of the said closure member.

3. In a gate valve, the combination of a valve casing and a reciprocally movable wedge closure member therefor with opposite outer tapered surfaces, the said casing consisting of a length of tubing having an upper transverse apertured portion, a slotted guide member for the said closure member of tubular form with a pair of slots oppositely disposed extending parallel to the central axis of the said guide member, said guide member snugly engaging said tubing transverse apertured portion to an extent not exceeding the wall thickness of the tubing, the said closure member having a pair of ears engaging the slots of the said guide member, a centerpiece snugly positioned over a peripheral portion of the said guide member and being formed with an arcuate recess at a lower annular edge thereof fitting over a curved outer surface portion at the inner end of the said casing in fluid sealing relation immediately adjacent the apertured portion thereof, valve seat members snugly fitted within and retained within opposite open ends of the said casing to extend inwardly beyond the inner limits of the casing transverse apertured portion, the said seat members cooperating with said closure member and having their inner end limits defined by tapered annular seating surfaces mating with the said opposite outer tapered surfaces to form a fluid sealing wedge contact with said opposite outer tapered surfaces of the said closure member upon movement of the latter member to the valve closed position, smooth cylindrical mating surfaces on the said seat members and on the seat member retaining casing, a stuffing box member projecting outwardly from an upper open end portion of said centerpiece and having a lower cylindrical extension thereof snugly received within an upper open portion of the said centerpiece in non-rotatable fluid sealing relation thereto to limit the outward movement of the said reciprocally movable closure member, the said guide member being limitedly movable axially within said centerpiece to locate the latter member relative to the upper aperture of said casing tubing, a stem journalled within the lower cylindrical extension of said stuffing box member and beign relatively loosely connected to the said closure member to permit limited transverse movement of the latter member relative thereto as measured substantially by the space between the tapered annular seating surfaces of the seat members, fluid sealing means joining the said cylindrical mating surfaces of the said seat members to opposite ends of the said length of tubing and defined by the mating surfaces of the said casing whereby in assembly the said seat members may be inserted and rotated to mate the seating surfaces with the valve closure member and fixed in position by said fluid sealing means.

4. A gate valve construction, the combination of a valve casing and a reciprocally movable closure member therefor with tapered annular seating surfaces, the said casing consisting of a length of tubing having an upper transverse apertured portion, a slotted guide member for the said closure member of tubular form with oppositely disposed slots extending parallel to the central axis of the said guide member and with a lower peripheral edge portion thereof entering said tubing transverse apertured portion, the said closure member having oppositely disposed ears engaging the slots of the said guide member, a centerpiece snugly fitted over substantially the entire outer peripheral surface area of the said guide member except for said lower peripheral edge portion thereof entering said tubing transverse apertured portion and permitting limited axial movement of the latter member, said centerpiece being formed at its lower limit with edges defining oppositely disposed arcuately extending recesses straddling in fluid sealing relation the upper portion of the said casing on an edge surface thereof immediately adjacent the transverse apertured portion of the casing, valve seat members for the said closure member inserted from opposite open ends of the said casing tubing, the said seat members having outer enlarged shoulder portions adjoining the said tubing end limits and having their oppositely disposed inner end limits defined by tapered annular seating surfaces on the said closure member, a stuffing box member with an upper outwardly flared portion for receiving stem packing and provided with a depending hollow cylindrical extension snugly received within an upper open portion of the said centerpiece in non-rotatable sealed relation thereto for limiting the outward movement of the reciprocally movable closure member, a stem journalled within the said stuffing box member and relatively loosely connected with the said closure member, the said casing having end recesses defined by smooth cylindrical surfaces, the said seat members having smooth cylindrical mating surfaces in fluid sealing fixed relation to the casing cylindrical surfaces being initially rotatable on said cylindrical surfaces relative to the said casing during assembly whereby to provide for both axial and rotative adjustable movements of the said seat members to permit the tapered annular seating surfaces thereon to abut and to coincide in angularity with the similarly tapered annular seating surfaces of the said closure member when the latter member is in valve closed position, and means cooperating with said casing tubing for retaining the said seat members against axial movement within the casing in said valve closed position.

5. A gate valve construction, the combination of a valve casing with outer axially aligned open ends and a reciprocally movable closure member therefor with oppositely disposed seating surfaces, means for actuating the said closure member, the said casing consisting of a predetermined length of tubing having an upper transverse apertured portion, a slotted guide member of substantially tubular form fitted snugly as a liner within said tubing apertured portion with oppositely disposed slots extending parallel to the central axis of the valve on each side thereof, the said closure member having on each side thereof oppositely disposed projecting means engaging the slots of the said guide member, a centerpiece snugly fitted over an outer peripheral portion of the said guide member and being formed on a lower edge with an expanded saddle-like annular portion to fit over the said casing and said guide member at an upper periphery thereof and extending around the transverse apertured portion of the tubing in fluid sealing relation thereto, valve seat members with reduced inner and cylindrical portions inserted from said opposite open ends of the said casing tubing, the said seat members having outer enlarged sections for effecting pipeline connections and with the inner portion of said seat members being of reduced diameter retained within said casing and defined at the inner ends thereof by annular seating surfaces mating with said seating surfaces of the said closure member when the latter member is in valve closed position, the said casing and the reduced portions of said seat members having smooth cylindrical mating surfaces thereon, the said seat members being snugly received in said open ends of said casing tubing on said mating surfaces, and with fluid tight means cooperating with said mating surfaces of the seat members and said casing to retain said valve seat members against axial movement relative to the said length of tubing and in axially fixed abutting relation to the oppositely disposed seating surfaces of the said closure member in said valve closed position.

6. In a gate valve construction, the combination of a valve casing and a reciprocally movable closure member therefor having tapered annular seating surfaces on opposite ends thereof, the said casing consisting of a length of tubing having an upper transverse apertured portion, a slotted guide member for the said closure member of sleeve-like form with oppositely disposed slots extending parallel to the central axis of the said guide member, the said closure member having oppositely disposed ears on side portions thereof engaging the slots of the said guide member, a centerpiece superposed over the said guide member in a sliding fit and being formed at its lower limit with oppositely disposed arcuately extending recesses straddling the said casing tubing in fluid sealing relation immediately adjacent the rim of the transverse apertured portion of the tubing, valve seat members for the closure member of generally hollow cylindrical form retained in openings in opposite ends of the said length of tubing, connecting means for sealing said seat members relative to the said casing, the said seat members having outer annular flanged ends providing pipeline connections and with their inner end limits defined by tapered annular seating surfaces mating with said tapered annular seating surfaces on the said closure member when the latter is in substantially valve closed position, a stem journally mounted within the said centerpiece and being loosely connected with the said closure member to reciprocally move the latter member concurrently with permitting limited transverse movement relative to the stem and inner end limits of said valve seats, the said sleeve-like guide member fitting snugly within the tubing upper transverse apertured portion and being supported against axial movement in a direction toward the interior of the casing tubing by the said valve seat members when the latter members are in said closure member mated position, smooth cylindrical mating surfaces on the seat members and the seat member retaining casing and fluid sealing connecting means disposed on the mating surfaces between the seat member flanged ends and the inner end portion of the said casing length of tubing for holding each of the said valve seat members firmly against the respective tapered annular seating surfaces on said opposite disposed sides of the said closure member and whereby in assembly, the seat members may be inserted and rotated to mate said opposite disposed sides of said closure member and fixed in position by said fluid sealing connecting means.

References Cited in the file of this patent

UNITED STATES PATENTS

| | | |
|---|---|---|
| 2,034,418 | Plant | Mar. 17, 1936 |
| 2,627,651 | MacGregor | Feb. 10, 1953 |
| 2,683,581 | Rovang | July 13, 1954 |